(No Model.) 2 Sheets—Sheet 1.

W. M. PRESTON.
LATHE CHUCK.

No. 316,912. Patented Apr. 28, 1885.

WITNESSES
F. W. Howard
E. A. Dick

INVENTOR
W. M. Preston
by C. H. Walter & Co
Attorney (No Model.) 2 Sheets—Sheet 2.
W. M. PRESTON.
LATHE CHUCK.
No. 316,912. Patented Apr. 28, 1885.
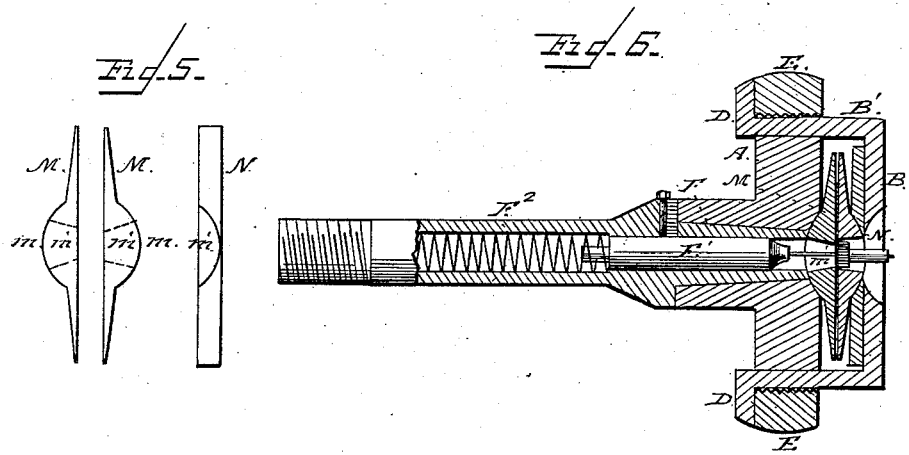
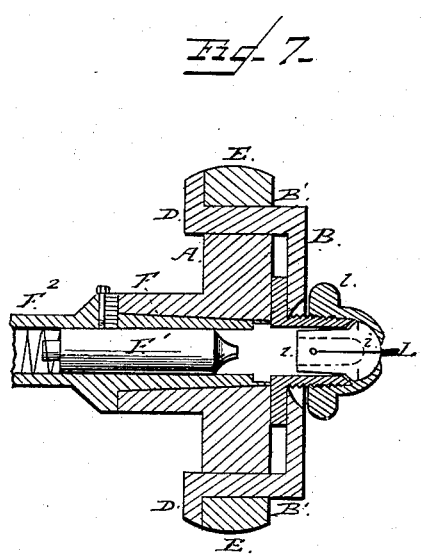
WITNESSES
F. W. Howard
E. H. Dick
INVENTOR
W. M. Preston
by C. H. Wilson & Co.
Attorneys

UNITED STATES PATENT OFFICE.

WILLIAM M. PRESTON, OF SCHOHARIE, NEW YORK.

LATHE-CHUCK.

SPECIFICATION forming part of Letters Patent No. 316,912, dated April 28, 1885.

Application filed November 21, 1884. (No model.)

*To all whom it may concern:*

Be it known that I, WILLIAM M. PRESTON, a citizen of the United States, residing in Schoharie, in the county of Schoharie and State of New York, have invented certain new and useful Improvements in Lathe-Chucks, of which the following is a specification.

My invention relates to that class of lathe-chucks called "frictional centering-chucks;" and the purpose thereof is to provide a device adapted for use in watch-makers' or other lathes in which the work may be easily and quickly centered with perfect accuracy, and having a capacity for the entire range of lathe-work—such as drilling, pivoting, turning, polishing, and other operations. It is also the purpose of my invention to so construct the chuck that I may combine therewith attachments for special purposes hereinafter described.

The invention consists in the several novel features of construction and combinations of parts hereinafter fully described, and definitely pointed out in the claims annexed to this specification.

Figure 1:
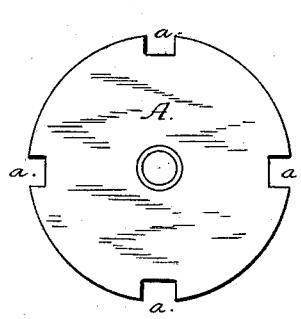
Figure 2:
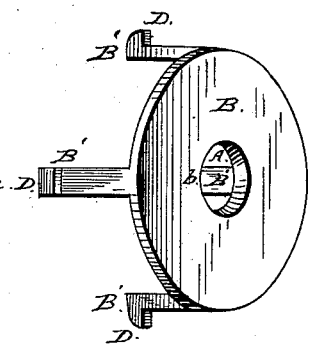
Figure 3:
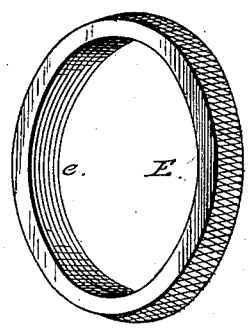
Figure 3:
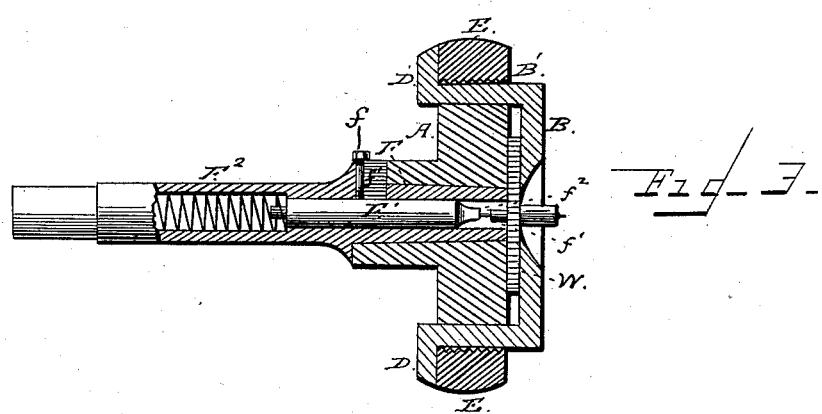
Figure 4:
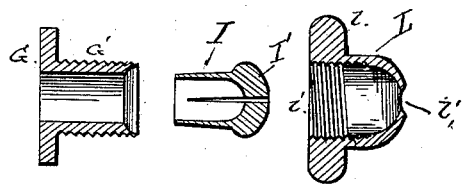

Referring to the drawings forming part of this application, Figure 1 is a front elevation of the chuck-head, the face-plate being removed. Fig. 2 is a perspective view of the face-plate, together with the enveloping-ring. Fig. 3 is a central vertical section of the chuck complete. Fig. 4 is a sectional view of the attachment plate, drill-holder, and cap. Fig. 5 is a detail of the oscillating attachment plates, together with the outer or adjustment plate. Fig. 6 is a central vertical section of the chuck with the parts shown in Fig. 5 attached. Fig. 7 is a central section of the chuck with the parts shown in Fig. 4 attached.

In the said drawings, the reference-letter A denotes the chuck-head, which is composed of a thick disk of steel or other metal, having a central aperture to receive the arbor. Upon the periphery of the head is cut an external screw-thread, and at equal intervals thereupon are formed rectangular grooves or slots $a$, cut parallel with the axis of the chuck-head and interrupting its peripheral screw-thread.

The letter B indicates the face-plate of the chuck, consisting of a disk of steel having a diameter a very little less than that of the chuck-head, and provided with a central opening, $b$, of such size as to expose a portion of the outer face of the head A.

Projecting from the rear side of the face-plate are four arms, B', having their outer edges lying in the circumferential plane of the disk or annulus B, and of such size and shape as to fit the grooves $a$ in the chuck-head with accuracy. I may of course, if I desire, use more arms than four, or even less. Upon the extremity of each of these arms is formed a flange, D, having its surface which is adjacent to the face-plate lying in a plane that is parallel with the latter. The construction of these parts is such that, when the face-plate is applied to the chuck-head, the arms B' will lie in and accurately fit the grooves $a$ of the chuck-head, their outer surfaces or edges being just beneath the peripheral thread cut thereupon.

The letter E represents the enveloping-ring, having an internal screw-thread, $e$, and milled or knurled upon its outer surface. This ring is of substantially the same thickness as the head B, and of such size that it may be turned thereon in the manner shown.

The chuck-head A is mounted upon an arbor, F, within which is placed a pump-center, F', which is normally projected forward by a spiral spring, F², in the usual manner. A screw, $f$, passes through a radial slot cut vertically in the arbor, as shown at $f'$, and having its point entering the pump-center F', and fastens said pump-center at any point to which it may be adjusted. A pivot-rest, $f^2$, is formed upon the outer extremity of the pump-center and lies in the true center or axial line of the arbor F.

The work, which is denoted by the letter W, is clamped between the face-plate and the outer face of the chuck-head, as shown in Fig. 3. It is inserted by placing one end of the post in the pump-center, the screw $f$ having been released for that purpose, and then applying the face-plate and enveloping-ring, turning the latter far enough to produce a light pressure upon the pinion. The work is then spun to center at its outer end and the ring screwed tightly on, the work being held thereby in such a manner that no lateral deviation is possible.

In those cases where an auxiliary support is required for the post or staff, and to prevent the pinion from "wabbling," I provide a pinion-attachment plate. (Shown in Fig. 4.) It consists of a disk or annulus, G, having a central cylindrical extension, G', which receives an auxiliary chuck, I, composed of a split tube having a slight external taper, and provided with a rounded head or end, I', having a central aperture to receive the end of the staff. The cylindrical extension G' is exteriorly threaded to receive a cap, L, provided with a flange or collar, l, and having its end rounded inside to fit over the rounded end of the auxiliary chuck I, and provided with an opening, l'. The manner of applying and using these attachments is fully shown in Fig. 8.

It is evident that the auxiliary chuck may be used to hold a drill or other tool, as well as to support long work in which both ends must be held to a true center. A drill-chuck having substantially a similar construction may, however, be substituted for the chuck I, and for very small drills a socket-holder may be used in connection therewith.

In Fig. 5 I show a modification which is attached, as shown in Fig. 6, to the lathe-chuck fully described in the foregoing specification. In this modification of parts shown to correct wabbling in pinions and wheels of lathe-chucks the letters M M represent metallic disks having their adjacent surfaces flat, and provided upon their opposite faces with central spherical segments, m m, each having a central opening, m'. From the base of each segment m the outer faces of the plates approach the inner or adjacent surfaces, as shown in Fig. 5. These plates when in use are interposed between the chuck-head, which is provided with a concavity to receive the spherical segment m, and a similarly-concaved disk, N, which lies against the face-plate. The work is clamped between the two, as shown in Fig. 6, the staff projecting through the openings m'. It will be readily seen that by this construction and arrangement of parts an oscillating movement of the pinion will be permitted.

Heretofore chucks have been used in which the enveloping-ring was provided with a flange to engage with a reversely-flanged face-plate; but in this class of devices it has been found impossible to wholly prevent lateral or radial displacement. Moreover, with such construction, it was either necessary to rely upon friction to prevent rotary displacement of the face-plate, or to provide a special construction for that purpose. Double segments, also, have been used, seated between the chuck-head and the face-plate, and combined with an auxiliary split chuck held by a set-screw tapped through a neck upon one of said segments. Such an attachment, however, not only is liable to the objections mentioned above, but it differs widely in construction and operation from my invention, and I make no claim, broadly, to such features.

In my invention the face-plate is held by arms parallel with the axis of the lathe-mandrel, and having positive engagement with the chuck-head. The enveloping-ring engages with the flanged extremities of these arms, and acts upon them in lines parallel with the axis of rotation and at right angles to the clamping-surfaces, both rotary and radial displacement being prevented by the positive engagement of the said arms with the chuck-head and by the ring which envelopes the latter, together with the arms.

By my attachments the entire range of lathe-work may be accomplished with the utmost accuracy, the work is easily applied and adjusted, and the danger of moving it from the dead-center during the process of fastening the face-plate is wholly avoided.

Having thus fully described my invention, what I claim and desire to secure by Letters Patent of the United States, is—

1. As an improvement in lathe-chucks, the chuck-head composed of a disk provided with a central opening, and having its periphery screw-threaded, and provided with grooves or slots at suitable distances apart, as shown and described, and for the purpose set forth.

2. In a lathe-chuck, the face-plate thereof, provided with a central opening, and having at its edge arms projecting to the rear and provided with flanges, as shown and described, and for the purpose set forth.

3. In a lathe-chuck, the combination, with the chuck-head, threaded and grooved on its periphery, of the face-plate having arms provided with flanges adapted to be connected to the chuck-head, as described, and a ring internally screw-threaded to engage the threads of the head and abut against the flanges of the arms, as shown and described.

4. In a lathe-chuck, the combination, with the annulus G, having the threaded extension G', to receive the auxiliary chuck I, provided with the rounded split head I', of the cap L, having flange l, provided with an opening, l', as shown and described, and for the purpose set forth.

5. In a lathe, the combination, with the chuck-head, of a face-plate having arms parallel with the axis of rotation engaging grooves in the periphery of the chuck-head, a ring threaded to engage the face-plate and flanges of the arms, a pinion-attaching plate clamped between the chuck-head and the face-plate, and having an extension projecting through the opening in the latter, a split chuck entering said extension, and a cap threaded thereon and holding the chuck, said cap having an opening which exposes the head of the chuck, substantially as specified.

In testimony whereof I have hereunto set my hand this 1st day of November, 1884.

WILLIAM M. PRESTON.

Witnesses:
J. WALLACE MARCH,
EZRA TWITCHELL.